United States Patent
Limpibunterng et al.

(10) Patent No.: US 8,977,432 B2
(45) Date of Patent: Mar. 10, 2015

(54) VEHICULAR STEERING CONTROL APPARATUS

(75) Inventors: Theerawat Limpibunterng, Susono (JP); Takahiro Kojo, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 676 days.

(21) Appl. No.: 12/918,255

(22) PCT Filed: Apr. 1, 2009

(86) PCT No.: PCT/IB2009/005162
§ 371 (c)(1),
(2), (4) Date: Aug. 18, 2010

(87) PCT Pub. No.: WO2009/122271
PCT Pub. Date: Oct. 8, 2009

(65) Prior Publication Data
US 2011/0010052 A1  Jan. 13, 2011

(30) Foreign Application Priority Data

Apr. 2, 2008  (JP) ................................. 2008-096370

(51) Int. Cl.
*B62D 6/00* (2006.01)
*B62D 11/00* (2006.01)
*B62D 12/00* (2006.01)
*B62D 5/04* (2006.01)

(52) U.S. Cl.
CPC .............. *B62D 5/046* (2013.01); *B62D 5/0481* (2013.01)
USPC ............................................ 701/41; 701/42

(58) Field of Classification Search
CPC ....................................................... B62D 6/00
See application file for complete search history.

(56) References Cited

U.S. PATENT DOCUMENTS

| 4,765,426 A | * | 8/1988 | Shimizu | ......................... 180/446 |
| 5,521,475 A | | 5/1996 | Fu et al. | |
| 7,977,830 B2 | * | 7/2011 | Yoshida et al. | .................. 310/54 |

(Continued)

FOREIGN PATENT DOCUMENTS

| EP | 0 599 260 | 6/1994 |
| EP | 1 293 413 | 3/2003 |

(Continued)

OTHER PUBLICATIONS

Office Action issued on Mar. 8, 2011 in the corresponding European Application No. 09 727 660.4-2425.

*Primary Examiner* — Ariel Yu
(74) *Attorney, Agent, or Firm* — Oblon, Spivak, McClelland, Maier & Neustadt, L.L.P.

(57) ABSTRACT

An ECU executes steering control in a vehicle including an electronic control power steering apparatus. In the steering control, it is determined that an assist motor is in a power generating state when a motor rotation speed ω which is the rotation speed of the assist motor is greater than an upper limit rotation speed ω1 set according to a motor command voltage Vq that is the driving voltage of the assist motor. When the assist motor is in the power generating state, the ECU interrupts the supply of current to the assist motor by controlling a relay portion of a drive apparatus that drives the assist motor so that it is open, thereby reducing the amount of power that is generated to zero. Also, when returning to an assist possible state, assist torque Tm is changed gradually with zero as the initial value in order to prevent it from changing suddenly.

14 Claims, 9 Drawing Sheets

(56) References Cited

U.S. PATENT DOCUMENTS

| | | | |
|---|---|---|---|
| 8,027,766 B2* | 9/2011 | Nozawa et al. | 701/41 |
| 2003/0071587 A1 | 4/2003 | Suzuki et al. | |
| 2008/0077301 A1* | 3/2008 | Suzuki et al. | 701/65 |
| 2008/0167776 A1* | 7/2008 | Collier-Hallman et al. | 701/41 |
| 2009/0234538 A1* | 9/2009 | Ta et al. | 701/41 |

FOREIGN PATENT DOCUMENTS

| | | |
|---|---|---|
| EP | 1 860 766 A1 | 11/2007 |
| EP | 2 090 494 A1 | 8/2009 |
| JP | 6 211142 | 8/1994 |
| JP | 2007 118785 | 5/2007 |
| JP | 2008 105652 | 5/2008 |

\* cited by examiner

F I G . 5
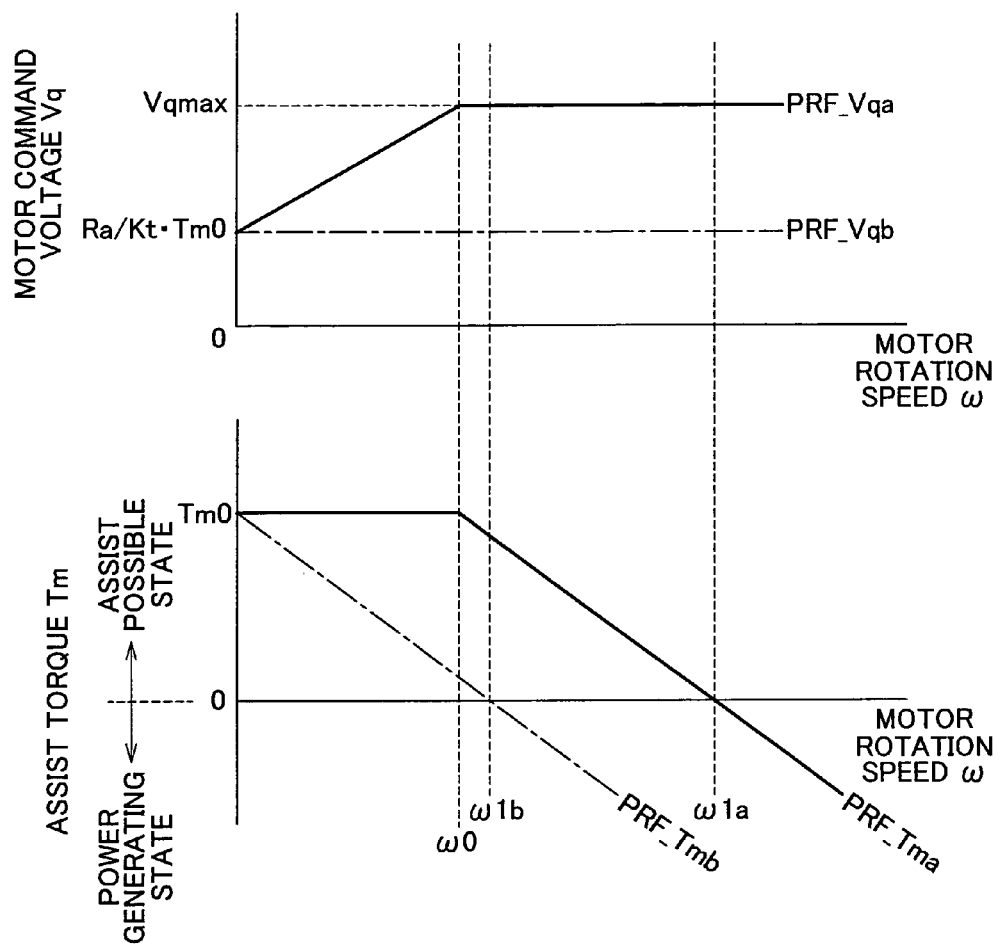

VEHICULAR STEERING CONTROL APPARATUS

CROSS-REFERENCE TO PRIORITY APPLICATION

The present application claims priority to Japanese patent application no. 2008-096370 filed on Apr. 2, 2008, the entire of contents of which including the specification, drawings, and abstract are incorporated herein by reference.

BACKGROUND OF THE INVENTION

1. Field of the Invention

The invention relates to the technical field of a steering control apparatus and steering control method for a vehicle provided with an electric power steering apparatus such as EPS (Electronic controlled Power Steering).

2. Description of the Related Art

Japanese Patent Application Publication No. 6-211142 (JP-A-6-211142), for example, proposes one type of electric power steering apparatus that takes the back electromotive force of an electric motor into account. The electric power steering apparatus described in JP-A-6-211142 (hereinafter referred to as the "related art") enables good steering feel to be obtained by calculating the back electromotive force of the electric motor based on the detected rotation speed of the electric motor, and correcting the applied voltage of the electric motor based on that calculated back electromotive force.

Incidentally, Japanese Patent Application Publication No. 2007-118785 (JP-A-2007-118785), for example, also proposes technology for preventing the steering feel according to the driver from deteriorating by correcting a q-axis target current when performing field weakening control on an electric motor.

The driving voltage of the motor is affected by physical or electrical limitations on the motor side, the specifications (such as the rated value) of the power supply such as a battery, or the SOC (State Of Charge) of the power supply that can change on a case-by-case basis, and thus has a fixed or variable upper limit value. Therefore, even if the applied voltage (which is one form of the driving voltage in this case) is corrected simply taking the back electromotive force into account as it is in the related art, the applied voltage is limited by the upper limit value and therefore may not be able to cancel the back electromotive force.

In this case, the back electromotive force may exceed the applied voltage, such that the motor falls into a power generating state. As a result, the motor may fall into a so-called reverse assist state in which the assist direction of the motor reverses from the direction in which assist is originally required. That is, with the related art there is the technical drawback that a steering operation by the driver may be impeded when the driving voltage of the motor is limited by the upper limit value.

SUMMARY OF THE INVENTION

In view of the foregoing problems, this invention thus provides a vehicular steering control apparatus and steering control method capable of suppressing decrease in handling when there is an upper limit value placed on the driving voltage of the motor.

Therefore, a first aspect of the invention relates to a steering control apparatus for a vehicle provided with an electric power steering apparatus having a motor capable of applying assist steering force to a steering shaft, and a drive apparatus capable of driving the motor by supplying driving voltage to the motor. This steering control apparatus includes a first control apparatus, a determining apparatus, and a second control apparatus. The first control apparatus controls the drive apparatus such that the driving voltage is supplied at equal to or less than a predetermined upper limit voltage to apply the assist steering force that is based on a steering amount of a predetermined kind to the steering shaft. The determining apparatus determines whether the motor is in a state that corresponds to a power generating state based on the rotation speed of the motor and the supplied driving voltage. The second control apparatus controls the drive apparatus to reduce the amount of power generated by the motor when it is determined that the motor is in the state that corresponds to the power generating state.

Also, a second aspect of the invention relates to a steering control method for a vehicle provided with an electric power steering apparatus having a motor capable of applying assist steering force to a steering shaft, and a drive apparatus capable of driving the motor by supplying driving voltage to the motor. This steering control method includes i) controlling the drive apparatus such that the driving voltage is supplied at equal to or less than a predetermined upper limit voltage to apply the assist steering force that is based on a steering amount of a predetermined kind to the steering shaft, ii) determining whether the motor is in a state that corresponds to a power generating state based on the rotation speed of the motor and the supplied driving voltage, and iii) controlling the drive apparatus to reduce the amount of power generated by the motor when it is determined that the motor is in the state that corresponds to the power generating state.

The assist steering force in the invention includes physical, mechanical, electrical, and magnetic force or the like which is applied to a steered wheel via a steering shaft (including a steering shaft, a column shaft, a pinion shaft, or any of a variety of types of shaft bodies provided in any of a variety of types of steering mechanisms such as a rack-and-pinion type steering mechanism or a ball-nut type steering mechanism) in response to a steering operation performed by a driver, and which is applied to the steering shaft in order to assist steering force which is physical force used to turn the steered wheels left or right with respect to the vehicle.

At this time, in view of the fact that the steering shaft includes the various shafts described above, the way in which assist steering force is transmitted to the steering shaft and the position in which the motor of the invention, which applies assist steering force to the steering shaft and which may be a DC brushless motor, for example, is arranged are not limited within substantial constraints (if such constraints exist) based at least on mounting space, cost, durability, or reliability and the like.

The drive apparatus of the invention includes physical, mechanical, structural, electrical, magnetic, and chemical means capable of driving the motor of the invention by directly or indirectly supplying driving voltage to the motor. For example, the drive apparatus may suitably include various constituent elements according to the structure, e.g., a power supply such as a battery, wiring material that creates a power supply route from the power supply to the motor, a switching device such as a relay circuit, various amplifying devices such as a FET (Field Emission Transistor), a rectifier such as an inverter, and a PWM (Pulse Width Modulation) circuit, and the like. Incidentally, the phrase "indirectly supplying driving voltage" may refer to supplying driving voltage as three-phase voltage through a three-phase conversion process, for example, or supplying driving voltage as pulse voltage that is based on a duty ratio according to PWM control, or the like.

With the steering control apparatus and steering control method for a vehicle according to the invention, during operation the drive apparatus is controlled to supply driving voltage to the motor by a first control apparatus which may take the form of any of a variety of computer systems such as a variety of controllers or microcomputers, or any one of a variety of processing units such as an ECU (Electronic Control Unit), or the like. This driving voltage is voltage for applying assist steering force that is based on a steering amount of a predetermined kind to the steering shaft (i.e., a target value for assist steering force; hereinafter referred to as "target assist steering force" when appropriate), and is a motor command voltage to be applied to the motor as it were. This driving voltage is actually different than the voltage supplied to drive the motor, which is affected by back electromotive force that will be described later. This driving voltage is set so that it is equal to or less than a predetermined upper limit voltage (incidentally, the phrase "equal to or less than" may simply be replaced by "less than" depending on the setting of the upper limit voltage. The question as to which range the value that defines the upper limit voltage is included in is a design issue and is of no relation to the essence of the invention.).

Here, the steering amount of a predetermined kind includes any of various physical quantities or control amounts which correlate with a steering operation by the driver, as well as index values that define those physical quantities or control amounts. For example, the "steering amount of a predetermined kind" may be steering torque applied via a steering wheel, a steering angle of the steering wheel, or a steering angle rate obtained by temporally differentiating the steering angle of the steering wheel.

Also, the upper limit voltage refers to, for example, a theoretical or substantial upper limit value that is defined by the configuration or structure of the motor or the drive apparatus or the like, or an upper limit value that is set beforehand to ensure the physical, mechanical, electrical, chemical, or magnetic durability or reliability of the power supply (e.g., any of variety of power storage devices such as a battery) of the motor or drive apparatus, according to the configuration or structure of the power supply based on testing, experience, theory, or simulation or the like, or to within a range where the supply of power to other equipment that uses that power supply will not be impeded.

Incidentally, voltage here refers to the electrical potential difference from a reference electrical potential, and may be either positive or negative. Therefore, strictly speaking, the term "upper limit voltage" is a threshold value when there is a positive electrical potential difference. When there is a negative electrical potential difference (e.g., one preferable mode is when the steering direction of the vehicle is different than it is when there is a positive electrical potential difference), that threshold value may become a lower limit value. However, the term "upper limit value" in the invention includes the upper limit value of the absolute electrical potential difference where this kind of polarity is irrelevant.

Meanwhile, the motor rotates passively from the rotation of the steering shaft in response to a steering operation by the driver. As a result, back electromotive force is generated according to that rotation speed (hereinafter referred to as "motor rotation speed" when appropriate). This back electromotive force acts in a direction that negates the driving voltage supplied to the motor, so the driving current of the motor is reduced by this kind of back electromotive force, which in turn reduces the assist steering force applied from the motor to the steering shaft. Incidentally, the driving current may take various forms according to the physical, mechanical, electrical, or magnetic structure or the like of the motor or drive apparatus, for example. For example, when so-called vector control is performed, the driving current may be a d-axis current or a q-axis current set on a d-q axis model in which the d-axis is set in a direction of a pair of magnetic poles of the rotor and the q-axis is set in a direction perpendicular to the d-axis. Alternatively, those currents may be converted to a three-phase current, i.e., a u-phase current, a v-phase current, and a w-phase current, through fixed coordinate conversion of the stator.

On the other hand, in view of the operation of the first control apparatus, when the assist steering force decreases as a result of this kind of back electromotive force, it is possible to increase the driving voltage to compensate for the decrease in the driving current through various feedback control such as PI control or PID control or the like. Ideally, even if back electromotive force is generated, it is possible to keep the assist steering force at a value that is equivalent to a target assist steering force or at least a value that can be considered equivalent to the target assist steering force in practice.

Incidentally, as described above, the driving voltage has an upper limit voltage that is set beforehand, or that is set separately and specifically on a case-by-case basis according to the load on the battery or the battery SOC (State Of Charge) or the like. Therefore, even if the driving voltage is increased as the back electromotive force increases, it will ultimately become saturated and the assist steering force will decrease.

Therefore, depending on the motor rotation speed, the back electromotive force may exceed the driving voltage, causing the polarity of the applied voltage of the motor to reverse. If this happens, the driving state of the motor switches from a powering state to a power generating state and the direction in which the assist steering force is applied becomes opposite the original direction (this kind of state of the electric power steering apparatus will be referred to as a "reverse assist state" or the like when appropriate). In the reverse assist state, assist steering force is applied in a direction that impedes a steering operation by the driver, and as a result, the steering operation by the driver is significantly inhibited. That is, when the motor is in the power generating state, vehicle handling decreases significantly.

Therefore, with the steering control apparatus and steering control method for a vehicle according to the invention, during operation, the determining apparatus, which may take the form of any of a variety of computer systems such as a variety of controllers or microcomputers, or any one of a variety of processing units such as an ECU (Electronic Control Unit), or the like, determines whether the motor is in a state that corresponds to the power generating state based on the motor rotation speed and the driving voltage.

Here, the state that corresponds to the power generating state includes at least a power generating state, and also preferably a state in which it is predicted or estimated (i.e., a predicted power generating state), with accuracy to a degree where there is at least no significant problem in practice, that the motor will soon (e.g., within a fixed or variably set limited period of time) fall into the power generating state. Therefore, it is not absolutely necessary that the motor actually be in the power generating state at the moment it is determined by the determining apparatus that the motor is in the state that corresponds to the power generating state. In other words, the concept of determining related to the determining apparatus may also include the indeterminate concepts of predicting, presuming, and estimating, and the like.

As described above, there is a correlation, whether it be linear, nonlinear, or saturated or unsaturated at a given point, between the motor rotation speed and the back electromotive force that is generated. The determination can be made with accuracy to a degree where there is at least no significant problem in practice, based on the motor rotation speed and the driving voltage. Also, preferably the motor rotation speed and the driving voltage are both control amounts that are normally monitored in the electric power steering apparatus, and the determining apparatus is able to reference these quickly.

Incidentally, any one of a variety of separate and specific determining modes that are based on the motor rotation speed and the driving voltage may be used. In one preferable mode, even though the determination as to whether the motor is in the state that corresponds to the power generating state is ultimately affected by the upper limit voltage of the drive apparatus, when the first control apparatus increases the driving voltage to keep the assist steering force at the target assist steering force, the upper limit voltage may not always need to be referenced when making that determination because the control mode of the first control apparatus may be any one of various modes.

Meanwhile, with the steering control apparatus and steering control method for a vehicle according to the invention, during operation, the second control apparatus, which may take the form of any of a variety of computer systems such as a variety of controllers or microcomputers, or any one of a variety of processing units such as an ECU (Electronic Control Unit), or the like, controls the drive apparatus according to the determination results from the determining apparatus. More specifically, the second control apparatus controls the drive apparatus to reduce the amount of power generated by the motor when it is determined that the motor is in the state that corresponds to the power generating state.

Here, the control mode when the second control apparatus decreases the amount of power generated by the motor is not particularly limited as long as the amount of power generated by the motor is able to be reduced at least to a degree where a decrease in vehicle handling can be greatly suppressed. For example, the second control apparatus may control the drive apparatus so that the amount of power generated is reduced to zero, or it may control the drive apparatus so that the amount of power that is generated is reduced by a step width that is set beforehand or that can be set separately and specifically on a case-by-case basis. Also, at this time, the second control apparatus may reduce the amount of power that is generated in two steps, incrementally (i.e., in a plurality of steps), or continuously (i.e., in a non-stepped manner). Incidentally, it is not always necessary to monitor the amount of power that is actually generated in the control by the second control, apparatus to reduce the amount of power that is generated.

In this way, with the steering control apparatus and steering control method for a vehicle according to the invention, it is possible to quickly and accurately determine whether the motor is in the power generating state, or whether the motor will soon fall into the power generating state. In addition, when the motor is in the power generating state or when it is predicted or estimated that the motor will soon fall into the power generating state, the amount of power generated by the motor can be reduced. That is, the amount of power generated by the motor is primarily assist steering force that is in the direction opposite the normal direction (hereinafter referred to as "reverse assist steering force" when necessary), which the motor applies to the steering shaft. Reducing the amount of power generated by the motor reduces the reverse assist steering force that acts in the direction opposite the direction intended by the driver. As a result, a decrease in the steering feel of the vehicle can be greatly suppressed at least compared to when this type of control is not performed.

Also, in the steering control apparatus and steering control method described above, whether the motor is in the state that corresponds to the power generating state may be determined by comparing i) an upper limit rotation speed which defines an upper limit of an absolute value of the rotation speed of the motor capable of applying the assist steering force and which is set based on the supplied driving voltage, with ii) the absolute value of the rotation speed of the motor.

According to the steering control apparatus and steering control method described above, the determination as to whether the motor is in a state that corresponds to the power generating state is made based on a comparison between the motor rotation speed and the upper limit rotation speed (one preferable mode includes determining that the motor is in a state that corresponds to the power generating state when the motor rotation speed is greater than the upper limit rotation speed (in this case, "greater than" can be easily replaced by "equal to or greater than" depending on the setting of the upper limit voltage. The question as to which range the value that defines the upper limit rotation speed is included in is a design issue and is of no relation to the essence of the invention.)), so that determination can be made simply and accurately.

Incidentally, the expression "absolute value" is used considering a case in which the direction of motor rotation is indicated by a plus or minus sign which corresponds to the steering direction of the vehicle (i.e., if the absolute value is not used, then strictly speaking (though irrelevant to the essential portion of the invention), this type of value with respect to the negative rotational direction may be the lower limit instead of the upper limit).

Also, in the steering control apparatus and steering control method described above, the drive apparatus may be controlled such that the supply of driving voltage is interrupted when it is determined that the motor is in a state that corresponds to the power generating state.

According to the steering control apparatus and steering control method described above, when the motor is in the state that corresponds to the power generating state, the supply of driving voltage is interrupted by taking steps such as opening the motor relay when this type of relay circuit is provided as a constituent element of the drive apparatus), for example. Accordingly it is possible to easily reduce the amount of power that is generated to zero (i.e., the motor can be placed in a state in which it is nothing more than a physical load because no current is being supplied). That is, the reverse assist steering force can be easily reduced to zero.

Also, in the steering control apparatus and steering control method described above, the assist steering force may be gradually changed to a target value when the state of the motor changes from the power generating state to an assist possible state that corresponds to a state other than the power generating state.

According to the steering control apparatus and steering control method described above, when the motor changes (i.e., returns) from the power generating state (or at least part of the state that corresponds to the power generating state) to the assist possible state (a state which corresponds to a state other than the power generating state, i.e., a state that enables assist steering force to be applied in the normal direction), the assist steering force is gradually changed to the target value with various change characteristics, whether incrementally (i.e., in a plurality of steps) or continuously (i.e., in a non-stepped manner), or linearly or nonlinearly. Therefore, it is possible to prevent a situation from occurring in which, for example, vehicle handling decreases (e.g., the steering wheel suddenly feels lighter in response to a steering operation) due to the assist steering force sharply increasing when the motor shifts into the assist possible state. As a result, good handling can be ensured.

Incidentally, in the steering control apparatus and the steering control method described above, the drive apparatus may be controlled such that the initial value when gradually changing the assist steering force becomes zero when the state of the motor changes from the power generating state to the assist possible state.

According to the steering control apparatus and steering control method described above, the initial value when the assist steering force returns (i.e., starts to be gradually changed) becomes zero, which is preferable for suppressing as quickly as possible an odd sensation from being imparted when assist steering force starts to be applied.

Further, in the steering control apparatus and steering control method described above, the vehicle may also at least have a variable gear ratio steering apparatus, which is capable of changing the steering gear ratio that is the ratio between the input steering angle and the input steering angle, provided on the upstream side of the motor. In addition, in the steering control apparatus and steering control method for a vehicle described above, the variable gear ratio steering apparatus may be controlled to change the steering gear ratio according to the steering amount, and a control range of the steering gear ratio may be controlled according to the rotation speed of the motor when it is determined that the motor is not in the state that corresponds to the power generating state.

According to the steering control apparatus and steering control method described above, the vehicle is provided with a variable steering gear ratio apparatus such as VGRS (Variable Gear Ratio Steering), for example (incidentally, the same function as that of the variable steering gear ratio apparatus may also be incorporated into an electric power steering apparatus). For example, the steering gear ratio which is the ratio of the steering angle dictated by a steering wheel operation (also referred to as the "input steering angle") to the actual steering angle of the steered wheels (also referred to as the "output steering angle") is controlled to vary in two steps, incrementally (i.e., in a plurality of steps), or continuously (in a non-stepped manner) within a control range that is set beforehand, for example, according to the steering amount described above, by a third control apparatus that may take the form of any of a variety of computer systems such as a variety of controllers or microcomputers, or any one of a variety of processing units such as an ECU.

On one hand, the variable steering gear ratio apparatus has a structure which at least includes, for example, any of a variety of reduction mechanisms and a motor (hereinafter referred to as a "VGRS (Variable Gear Ratio Steering) side motor" when appropriate. The "motor" of the invention will be referred to as an "EPS side motor" when necessary to distinguish it from the VGRS side motor.) and which is capable of applying physical force to a steering shaft in order to vary the steering gear ratio, provided on the upstream side of the electric power steering apparatus. Accordingly, the rotation speed of the EPS side motor described above is increased or decreased appropriately according to the rotation speed of the VGRS side motor. More specifically, when the change amount of the output steering angle with respect to the input steering angle is relatively large (i.e., when the steering gear ratio is relatively small), the rotation speed of the VGRS side motor increases so the rotation speed of the EPS side motor is also increased.

On the other hand, the EPS side motor has an upper limit rotation speed as described above. Therefore, if the rotation speed of the steering shaft is increased by the VGRS side motor and, as a result, the rotation speed of the EPS side motor is increased, when at least the EPS side motor is in the assist possible state and is driven to apply assist steering force, the motor rotation speed may exceed the upper limit rotation speed depending on the situation. In this case, the amount of assist steering force that can be applied becomes limited, which may cause the steering wheel to feel heavy in response to a steering operation. As a result, vehicle handling may decrease.

Therefore, according to the steering control apparatus and steering control method described above, when it is determined that the EPS side motor is not in the state that corresponds to the power generating state, the control range of the steering gear ratio (i.e., one preferable mode being a correction amount of the rotation speed of the steering shaft by the VGRS motor) is limited according to the rotation speed of the EPS side motor by the limiting apparatus which may take the form of any of a variety of computer systems such as a variety of controllers or microcomputers, or any one of a variety of processing units such as an ECU, or the like.

Incidentally, at this time, priority may be given to applying assist steering force from the EPS side motor so the control range of the steering gear ratio of the variable steering gear ratio apparatus may be limited such that the rotation speed of the EPS side motor becomes equal to or less than the upper limit rotation speed.

This kind of operation and other advantages of the invention will become evident from the example embodiments described below.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 5 is a graph showing a frame format of an example of a characteristic of motor command voltage and assist torque with respect to motor rotation speed in the vehicle shown in FIG. 1;

DETAILED DESCRIPTION OF EMBODIMENTS

Hereinafter, various example embodiments relating to the vehicular steering control apparatus of the invention will be described with reference to the drawings when appropriate. First, the structure of a vehicle 10 according to a first example embodiment of the invention will be described with reference to FIG. 1, which is a schematic diagram conceptually showing the basic structure of the vehicle 10.

Figure 1:
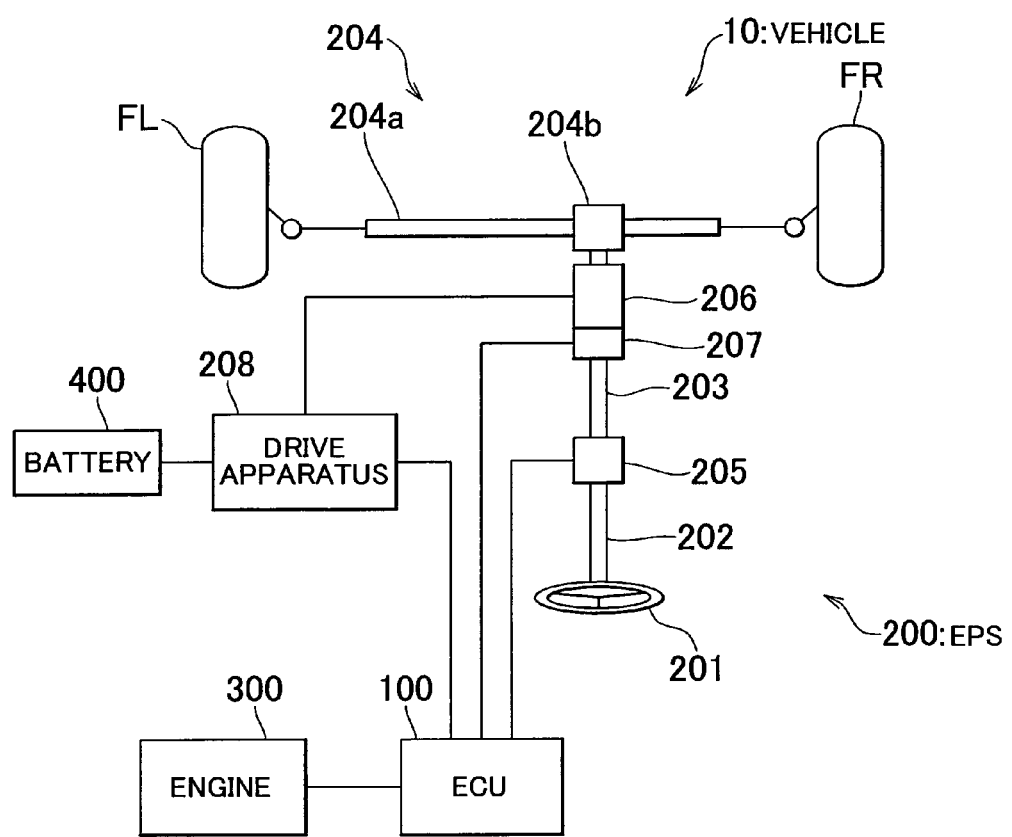
FIG. 1 is a schematic diagram conceptually showing the structure of a vehicle according to a first example embodiment of the invention.

In FIG. 1, the vehicle 10 has a pair of left and right front wheels FL and FR, which are the steered wheels, and is structured so as to be able to move in a desired direction by these front wheels being steered.

The vehicle 10 includes an ECU 100, an EPS 200, and an engine 300.

The ECU 100 is an electronic control unit that includes a CPU (Central Processing Unit), ROM (Read Only Memory), and RAM (Random Access Memory), none of which are shown, and controls the overall operation of the vehicle 10. The ECU 100 is one example of a steering control apparatus of a vehicle of the invention. The ECU 100 executes basic steering control, which will be described later, to control the operation of the EPS 200 according to a control program stored in the ROM.

Incidentally, the ECU 100 is an integrated electronic control unit that functions as an example of a determining apparatus, a first control apparatus, a second control apparatus, a third control apparatus, and a limiting apparatus, respectively, of the invention. The operations related to each of these apparatuses are all executed by the ECU 100. However, the physical, mechanical, and electrical structures of these apparatuses according to the invention are not limited to this. For example, the apparatuses may also be in the form of a variety of computer systems such as a variety of controllers or microcomputers, or a variety of processing units such as a plurality of ECUs, or the like.

The EPS 200 is an example of an electric power steering apparatus of the invention, which steers the front wheels FL and FR that serve as the steered wheels.

The EPS 200 includes a steering wheel 201, a steering shaft 202, a pinion shaft 203, a rack-and-pinion mechanism 204, a torque sensor 205, an assist motor 206, a rotation sensor 207, and a drive apparatus 208.

The steering wheel 201 is a steering device that functions as an interface via which a driver can perform a steering operation.

The steering shaft 202 is a shaft body that is connected to the steering wheel 201 and rotates in the same direction as the steering wheel 201 when the driver turns the steering wheel 201.

The pinion shaft 203 is a rotatable shaft body that serves as an example of a steering shaft of the invention and is connected to a pinion gear 204b, which will be described later, at the downstream end portion (that is, the portion that is downstream with respect to the direction in which steering input is transmitted, i.e., on the side of the steered wheels). The pinion shaft 203 rotates in the same direction as the steering shaft 202.

The rack-and-pinion mechanism 204 is a steering mechanism that includes the pinion gear 204b which is connected to the downstream end portion of the pinion shaft 203, and a rack bar 204a on which gear teeth that mesh with gear teeth on the pinion gear 204b are formed. The rack-and-pinion mechanism 204 transmits steering force to each of the steered wheels via a knuckle and a tie rod (neither of which are denoted by reference numerals) that is connected to the downstream end portion of the rack bar 204a, by converting the rotation of the pinion gear 204b into lateral (i.e., left and right in the drawing) movement of the rack bar 204a. That is, the so-called rack-and-pinion steering method is realized with the EPS 200 by the rack-and-pinion mechanism 204.

Incidentally, in this example embodiment, the pinion shaft 203 and the pinion gear 204b are directly connected so the rotation speed of the pinion shaft 203 is the same as the rotation speed of the pinion gear 204b. However, this is only an example. Alternatively, for example, the rotation speed of the pinion shaft 203 may also be transmitted to the pinion gear 204b after being appropriately reduced by, for example, a reduction gear having a fixed or variable reduction gear ratio.

Incidentally, an example of a rack-and-pinion type steering mechanism is used with the EPS 200 in this way, but a ball-nut type steering mechanism or some other similar type of steering mechanism may also be used. Also, even if a rack-and-pinion type steering mechanism is used, the type and shape of the constituent elements, and the way in which those constituent elements are spatially arranged, and the like, are not in any way limited within substantial constraints (if such constraints exist) based at least on mounting space, cost, durability, or reliability and the like.

The torque sensor 205 is a sensor that detects steering torque MT input by the driver (which is one example of a steering amount of a predetermined kind in the invention). More specifically, the downstream end portion of the steering shaft 202 and the upstream end portion of the pinion shaft 203 are connected by a torsion bar, not shown, and a ring for detecting a rotational phase difference is fixed to both the upstream and the downstream end portions of the torsion bar. This torsion bar twists according to, and in the rotational direction of, steering torque that is transmitted via the steering shaft 202 when the driver of the vehicle 10 turns the steering wheel 201, thereby transmitting the steering torque to the pinion shaft 203 while producing torsion.

Therefore, when steering torque is transmitted, a rotational phase difference occurs between the rings for detecting a rotational phase difference described above. The torque sensor 205 detects this rotational phase difference, converts it into steering torque, and outputs an electric signal indicative of this steering torque MT. Also, the torque sensor 205 is electrically connected to the ECU 100 so that the ECU 100 is able to obtain the detected steering torque MT at fixed or varying cycles.

Incidentally, when the torque sensor 205 detects the steering torque MT in this way, it also detects the steering direction. For example, the torque sensor 205 detects the steering torque MT with a plus sign when the steering wheel 201 is turned to the right (or left), i.e., when the steering direction is to the right (or left), and detect the steering torque MT with a minus sign when the steering wheel 201 is turned to the left (or right), i.e., when the steering direction is to the left (or right).

The assist motor 206 is a DC brushless motor which is one example of the motor of the invention. This assist motor 206 has i) a rotor, not shown, to which permanent magnets are mounted and which is fixed to the pinion shaft 203 described above, and ii) a stator, also not shown, that encircles the rotor. The assist motor 206 generates assist torque Tm (which is one example of assist steering force in the invention) by the rotor rotating from the action of a rotating magnetic field created inside the assist motor 206 by supplying current to the stator via the drive apparatus 208. The direction in which the assist torque Tm is generated is the same as the direction of the rotation of the rotor.

Incidentally, the way in which the assist steering torque in the invention is applied is not limited to that which is illustrated here. Alternatively, for example, torque output from the motor may be transmitted to the pinion shaft after the rotation speed is reduced using a reduction gear, not shown, or assist steering force may be applied as force that assists with the rotation of the pinion gear or as force that assists with the reciprocal movement of the rack bar instead of the rotational movement the pinion shaft. That is, the way in which the assist steering force is output in the invention is not limited as long as the assist torque that is output from the assist motor 206 can ultimately be supplied as at least part of the steering force that steers the steered wheels.

The rotation sensor 207 is a type of rotary encoder that is mounted to the assist motor 206. This rotation sensor 207 detects the motor rotation speed ω which is the rotation speed of the assist motor 206 with information regarding the rotational phase. The rotation sensor 207 is electrically connected to the ECU 100 so that the ECU 100 is able to obtain the detected motor rotation speed ω at fixed or varying cycles. Incidentally, the apparatus that detects the rotation speed of the assist motor 207 is not limited to being a rotary decoder, but may also be a resolver or the like, for example.

The drive apparatus 208 is an example of the drive apparatus of the invention, and controls the state of the rotating magnetic field created in the assist motor 206 by supplying current to the stator of the assist motor 206. The drive apparatus 208 is electrically connected to the ECU 100 so that the ECU 100 is able to control the operation of each part of the drive apparatus 208.

Here, the structure of the drive apparatus 208 will be described with reference to FIG. 2 which is a block diagram of the drive apparatus 208. Incidentally, those portions in FIG. 2 that are the same as portions in FIG. 1 will be denoted by like reference characters and descriptions of those portions will be omitted where appropriate.

Figure 2:
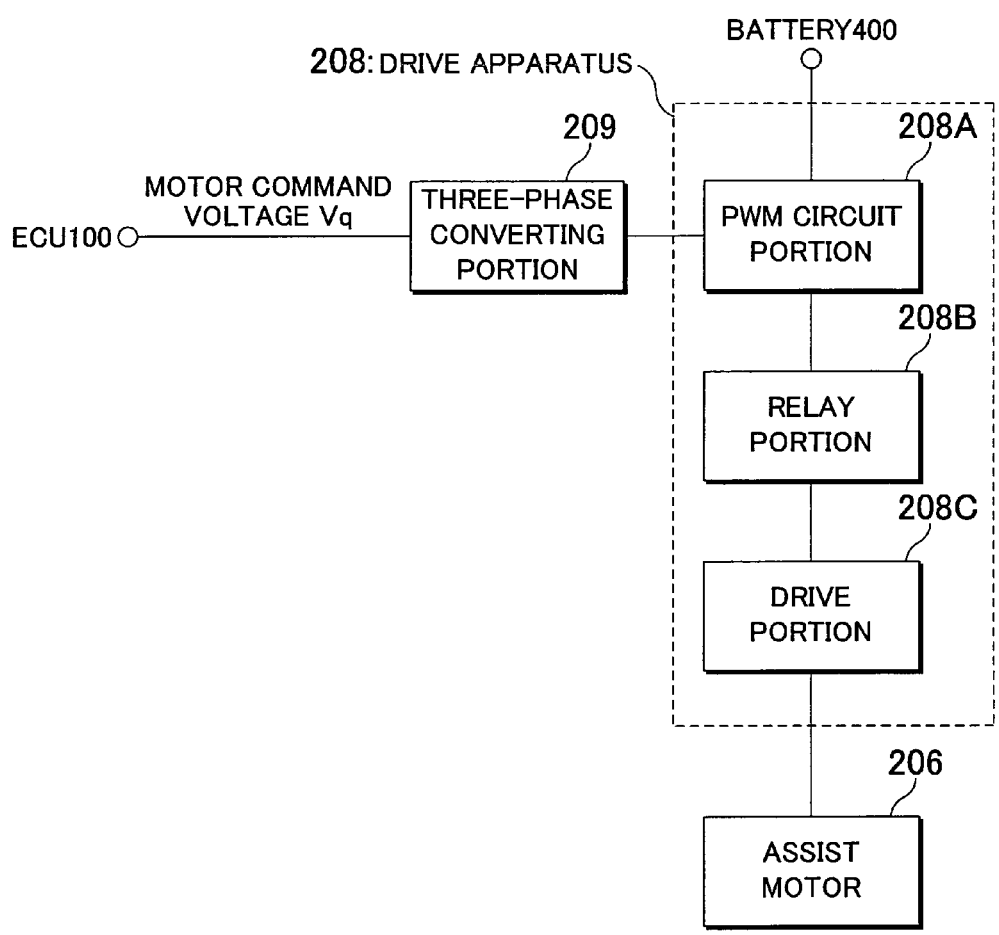
FIG. 2 is a block diagram of a drive apparatus provided in the vehicle shown in FIG. 1.

As shown in FIG. 2, the drive apparatus 208 includes a PWM (Pulse Width Modulation) circuit portion 208A, a relay portion 208B, and a drive portion 208C. Incidentally, the mode of control when driving the assist motor 206 may be any one of various known modes. That is, the mode of driving the assist motor 206 that includes the structure of the drive apparatus 208 is not necessarily limited to the mode illustrated here.

The PWM circuit portion 208A is a circuit that produces a PWM control voltage signal indicative of a motor command voltage Vq (i.e., the q-axis voltage of the assist motor 206) which is one example of the driving voltage in the invention, and supplies this PWM control voltage, signal to the drive portion 208C. Incidentally, the motor command voltage Vq is supplied to the PWM circuit portion 208A after being converted to a three-phase command voltage, i.e., a u-phase command voltage Vu, a v-phase command voltage Vv, and a w-phase command voltage Vw, by three-phase conversion processing which is performed on the ECU 100 side by a three-phase converting portion 209.

Incidentally, the motor command voltage Vq has a positive value and a negative value, one of which corresponds to one steering direction of the vehicle 10 (such as to the right) and the other of which corresponds to the other steering direction of the vehicle 10 (such as to the left). Similarly, the motor rotation speed ω also has a positive value and a negative value, one of which corresponds to one steering direction of the vehicle 10 (such as to the right) and the other of which corresponds to the other steering direction of the vehicle 10 (such as to the left). Consequently, the assist torque Tm that is output from the assist motor 206 is indicated by a plus sign or a minus sign, one of which corresponds to one steering direction of the vehicle 10 (such as to the right) and the other of which corresponds to the other steering direction of the vehicle 10 (such as to the left).

The relay portion 208B is a contact circuit that selectively allows or interrupts the flow of current between the PWM circuit portion 208A and the drive portion 208C, depending on the state of the relay portion 208B, i.e., whether the relay portion 208B is short circuited or open. That is, when the relay portion 208B is short circuited, current is able to flow between the PWM circuit portion 208A and the drive portion 208C. When the relay portion 208B is open, the flow of current from the PWM circuit portion 208A to the drive portion 208C is interrupted.

The drive portion 208C is a circuit that includes a power transistor corresponding to each phase of the stator, and an inverter circuit, and the like, in order to supply current to the stator of the assist motor 206. The drive portion 208C is electrically connected to the PWM circuit 208A and receives a PWM control voltage signal at a gate terminal of each power transistor. The assist motor 206 is driven by an assist current Iq, which is a drive current that is supplied to the stator, according to the PWM control voltage signal input to the gate terminal, and outputs assist torque Tm.

The engine 300 is an internal combustion engine which functions as a power source of the vehicle 10 and uses gasoline as fuel. For example, the engine 300 has a plurality of cylinders, such as 4, 6, 8, or 12, and may be of any one of various configurations, such as an inline configuration, a V configuration, or a horizontally opposed configuration, depending on the arrangement of those cylinders. The driving force that is output from a crankshaft, not shown, in the engine 300 is applied to the front wheels FL and FR, which are the steered wheels, via a differential and a drive shaft and the like, not shown, as appropriate. That is, the vehicle 10 is a FF vehicle. Incidentally, the drive mode of the vehicle 10 is of course not limited to FF. For example, the drive mode may also be FR in which rear wheels, not shown, are driven, or four-wheel drive in which the front wheels and the rear wheels are driven. Moreover, the type of fuel used is not limited to gasoline. For example, alcohol or gas oil or the like may also be used. Further, the vehicle 10 may be a hybrid vehicle that is provided with a motor or the like as a power source in addition to the engine 300.

A battery 400 which is a vehicular battery is provided in the vehicle 10. The battery 400 functions as a power supply for various types of auxiliary equipment in the vehicle 10, including the EPS 200. Incidentally, the battery voltage Vbat, which is the voltage of the battery 400, is obtained by the ECU 100 at fixed or varying cycles.

Next, the operation of the example embodiment will be described with reference to the drawings when appropriate. First, the steering control that is executed by the ECU 100 will be described in detail with reference to FIG. 3 which is a flowchart of the steering control.

Figure 3:
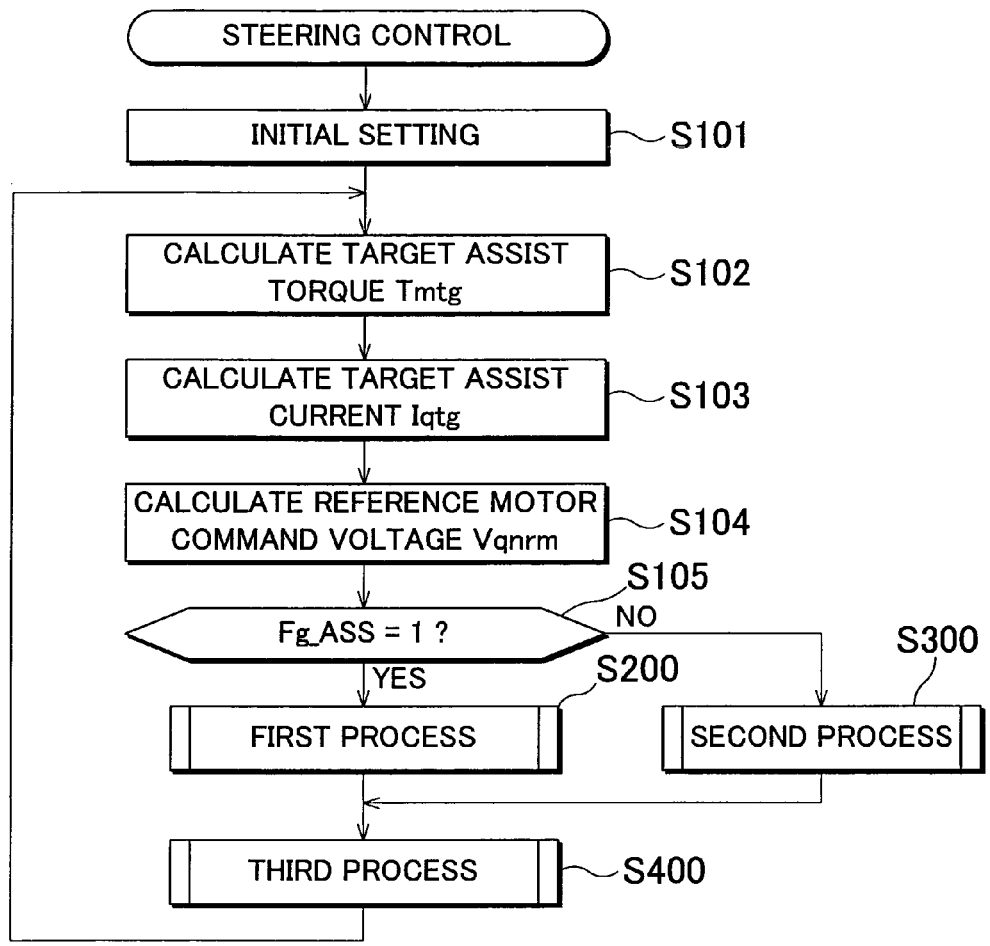
FIG. 3 is a flowchart of steering control executed by an ECU in the vehicle shown in FIG. 1.

In FIG. 3, the ECU 100 executes an initial setting process (step S101). In this initial setting process, the steering torque MT and the motor rotation speed ω are obtained by the torque sensor 205 and the rotation sensor 207, respectively. Incidentally, the steering torque MT and the motor rotation speed ω are hereafter fundamentally obtained at fixed cycles by the ECU 100 and are thus always updated to the latest values.

Also, in the initial setting process, the ECU 100 sets the motor command voltage Vq to 0 as the initial value. Furthermore, the ECU 100 sets an assist possible flag Fg_ASS, which indicates whether the assist motor 206 is in an assist possible state (i.e., a state in which it can be used to assist), which will be described later, to 1 as the initial value. A value of 1 in this case means that the assist motor 206 is in the assist possible state. The assist possible flag Fg_ASS is stored in an updatable manner in the RAM of the ECU 100, and is overwritten at appropriate predetermined update timings in the process of executing the steering control.

Incidentally, the assist possible flag Fg_ASS assumes a value of either 1 or 0. A value of 0 indicates that the assist motor 206 is in a power generating state which will be described later.

When the initial setting process ends, the ECU 100 calculates a target assist torque Tmtg which is a target value for the assist torque Tm of the assist motor 206 (step S102). At this time, the target assist torque Tmtg is calculated according to the steering torque MT obtained in step S101.

Here, the relationship between the steering torque MT and the target assist torque Tmtg will be described with reference to FIG. 4 which is a graph showing a frame format of a change characteristic of the target assist torque Tmtg with respect to the steering torque MT.

Figure 4:
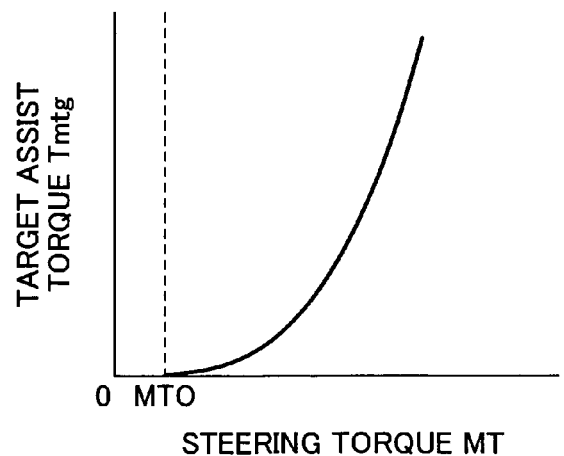
FIG. 4 is a graph showing a frame format of a change characteristic of target assist torque with respect to steering torque in the vehicle shown in FIG. 1.

In FIG. 4, the vertical axis represents the target assist torque Tmtg and the horizontal axis represents the steering torque MT. As shown in the graph, the target assist torque Tmtg is set as a function that increases nonlinearly as the steering torque MT increases. Also, the region where the steering torque MT is equal to or less than MT0 is an undetectable area so the target assist torque Tmtg is zero in this region.

Incidentally, only a case in which the steering torque MT is a positive value is shown in FIG. 4. However, the steering torque MT may have either a positive or negative value depending on the steering direction of the vehicle 10, as described above. The target assist torque Tmtg with respect to the steering torque MT on the negative side has a shape in which the characteristic shown in FIG. 4 is point-symmetric with respect to the point of origin (zero). The ECU 100 stores a target assist torque map, in which the relationship shown in FIG. 4 is converted into numerical terms, in the ROM beforehand, and calculates the target assist torque Tmtg by selectively obtaining a value that corresponds to the steering torque MT at that time from the target assist torque map. Incidentally, in this way, the calculation in this example embodiment includes selectively obtaining a value based on a corresponding relationship set beforehand.

Returning now to FIG. 3, when calculating the target assist torque Tmtg, the ECU 100 calculates a target assist current Iqtg which is a target value for the assist current Iq (step S103).

Here, the relationships shown in Expressions (1), (2), and (3) below exist among the assist torque Tm, the assist current Iq, and the motor command voltage Vq in the EPS 200 in this example embodiment. In the expressions, Kt is a torque constant of the assist motor 206, Kv is a back electromotive force coefficient (in units of V×sec/rad, for example), and Ra is an electrical resistance value. These are all stored as fixed values in the ROM beforehand.

$$Tm = Kt \times Iq \tag{1}$$

$$Iq = (Vq - Kv \times \omega)/Ra \tag{2}$$

$$Tm = Kt/Ra \times (Vq - Kv \times \omega) \tag{3}$$

Here, the target assist current Iqtg is calculated as shown in Expression (4) below by transforming Expression (1) by substituting the target assist torque Tmtg calculated earlier for the assist torque Tm. The ECU 100 calculates the target assist current Iqtg according to Expression (4) below.

$$Iqtg = Tmtg/Kt \tag{4}$$

Here, as additional information regarding Expression (3) above, with respect to the subtraction term in parentheses on the right side of Expression (3), the product of the back electromotive force coefficient Kv and the motor rotation speed ω corresponds to the back electromotive force generated by the rotation of the assist motor 206. If this back electromotive force is greater than the motor command voltage Vq, then the right side of Expression (3) will be a negative value and the sign of the steering torque MT will reverse. That is, at that time, the steering torque MT will become a reverse assist steering force that operates in a direction which negates the steering force, regardless of whether the original sign is positive or negative, and the assist motor 206 will be placed in a power generating state.

Here, the relationships among the motor command voltage Vq, the steering torque MT, and the motor rotation speed ω will be described with reference to FIG. 5 which is a graph showing a frame format of an example of a characteristic of the motor command voltage Vq and the assist torque Tm with respect to the motor rotation speed ω.

The characteristic of the motor command voltage Vq with respect to the motor rotation speed ω is shown in the upper part of FIG. 5, and the characteristic of the assist torque Tm with respect to the motor rotation speed ω is shown in the lower part of FIG. 5. Incidentally, the characteristic line PRF_Vqa (see the solid line) in the upper part of FIG. 5 corresponds to a case in which the target assist torque Tmtg is, Tm0 (Tm0>0) and the motor command voltage Vq to bring the assist torque Tm in line with the target assist torque Tmtg is controlled through PI control, which will be described later. The characteristic line PRF_Vqb (see the alternate long and short dash line) corresponds to a case in which the target assist torque Tmtg is Tm0 and the motor command voltage Vq is kept constant. Also, the characteristic line PRF_Tma (see the solid line) in the lower part of FIG. 5 corresponds to the characteristic line PRF_Vqa, and the characteristic line PRF_Tmb (see the alternate long and short dash line) corresponds to the characteristic line PRF_Vqb.

When the motor rotation speed ω is zero, the subtraction term on the right side in Expression (3) above is equal to the motor command voltage Vq so the motor command voltage Vq for outputting the target assist torque Tmtg becomes "Ra/Kt×Tm0" in both characteristics of the characteristic lines PRF_Vqa and PRF_Vqb, as shown in the drawing.

On one hand, if the motor rotation speed ω increases, the value of the subtraction term decreases according to that increased amount. Therefore, when the motor command voltage Vq is kept constant in accordance with the characteristic line PRF_Vqb, the assist torque Tm starts to decrease as the motor rotation speed ω increases, as shown by the characteristic line PRF_Tmb. As a result, the assist torque Tm becomes zero at a motor rotation speed of $\omega 1b$ ($\omega 1b > 0$).

On the other hand, when the motor command voltage Vq to keep the assist torque Tm at a target assist torque of Tm0 is increased in accordance with the characteristic line PRF_Vqa, the assist torque Tm is kept at the target assist torque Tm0 with respect to an increase in the motor rotation speed $\omega$ until the motor rotation speed $\omega$ becomes $\omega 0$, as shown by the characteristic line PRF_Tma.

Incidentally, a maximum command voltage Vqmax (i.e., an example of maximum voltage in the invention) which is either fixed or variable (in this example embodiment it is variable, as will be described later) is provided for the motor command voltage Vq, and the motor command voltage Vq is set to be equal to or less than this maximum command voltage Vqmax. Therefore, at the point when the motor rotation speed $\omega$ becomes $\omega 0$ and the motor command voltage Vq needed to keep the assist torque Tm at the target assist torque Tm0 becomes Vqmax, the motor command voltage Vq becomes saturated and the assist torque Tm starts to decrease as the motor rotation speed $\omega$ increases. As a result, the assist torque Tm becomes zero at a motor rotation speed $\omega$ of $\omega 1a$ ($\omega 1a > \omega 1b$), as shown by the characteristic line PRF_Tma.

Here, when the assist torque Tm is in the region below zero in the drawing, the sign of the assist torque Tm is reversed. This reversal in the sign of the assist torque Tm despite the fact that the signs of the motor command voltage Vq and the motor rotation speed $\omega$ do not change indicates that the assist torque Tm has changed to reverse assist torque that acts in a direction that negates the steering force. In this way, in this example embodiment the assist motor 206 is in the power generating state in the region where the signs of the motor command voltage Vq and the motor rotation speed $\omega$ are the same (in this example embodiment, a case in which the signs of the motor command voltage Vq and the motor rotation speed $\omega$ are the same corresponds to one steering direction) and the sign of the assist torque Tm is reversed, and in the assist possible state in the region where the signs of the motor command voltage Vq and the motor rotation speed $\omega$ are the same and the sign of the assist torque Tm is not reversed (i.e., where the assist torque Tm is equal to or greater than zero in FIG. 5).

In this way, in the EPS 200 there is a motor rotation speed $\omega$ (i.e., $\omega 1a$ or $\omega 1b$ described above, or the like) that determines whether the assist motor 206 is in the assist possible state or the power generating state as long as the motor command voltage Vq is limited by the maximum command voltage Vqmax. Hereinafter, this kind of upper limit value of the motor rotation speed $\omega$ will be referred to as the "upper limit rotation speed $\omega 1$" when appropriate. Incidentally, when $\omega$ is a negative value (i.e., the other steering direction), it of course becomes a lower limit value, but here only a case in which $\omega$ is a positive value will be described to avoid complicating the description. Also, this upper limit rotation speed $\omega 1$ is an example of the upper limit rotation speed in the invention.

Returning now to FIG. 3, when calculating the target assist current Iqtg, the ECU 100 calculates a reference motor command voltage Vqnrm that is a reference value for the motor command voltage Vq (step S104). Here, the reference motor command voltage Vqnrm is calculated through PI control (i.e., known feedback control that is based on a feedback correction amount that includes a proportional term and an integral term).

More specifically, the ECU 100 calculates the motor command voltage Vq to bring the difference $\Delta I$ between the target assist current Iqtg and the assist current Iq within a predetermined range (i.e., such that the assist torque Tm output from the assist motor 206 becomes asymptotic or converges with the target assist torque Tmtg). At this time, the value of the assist current Iq that is fed back is calculated by substituting in the motor command voltage Vq and the motor rotation speed $\omega$ at that time in Expression (2) above. However, when a detecting apparatus that can directly detect the assist current Iq is provided downstream of the drive portion 208C, for example, the value of the assist current Iq may be obtained from this detecting apparatus and used to calculate the difference $\Delta I$.

When calculating the reference motor command voltage Vqnrm, the ECU 100 determines whether the assist possible flag Fg_ASS is 1, i.e., whether the assist motor 206 is in the assist possible state (step S105). Incidentally, at the start of the steering control, the assist possible flag Fg_ASS is set to 1, which is the initial value, in the initial setting process in step S101 so the determination in step S105 is unequivocally yes at that time.

If the assist possible flag Fg_ASS is 1 (i.e., YES in step S105), i.e., if the assist motor 206 is in the assist possible state (i.e., in a state in which assist torque Tm will be output in the direction that will assist the steering force), the ECU 100 executes a first process which will be described later (step S200). If, on the other hand, the assist possible flag Fg_ASS is 0 (i.e., NO in step S105), i.e., if the assist motor 206 is in the power generating state (i.e., in a state in which assist torque Tm will be output in the direction that will negate the steering force), the ECU 100 executes a second process which will also be described later (step S300). After the first process or the second process is executed, the ECU 100 executes a third process (step S400), after which the routine returns to step S102 and the series of steps are repeated.

Next, the first process that is executed if the assist motor 206 is currently in the assist possible state will be described in detail with reference to FIG. 6 which is a flowchart of the first process.

Figure 6:
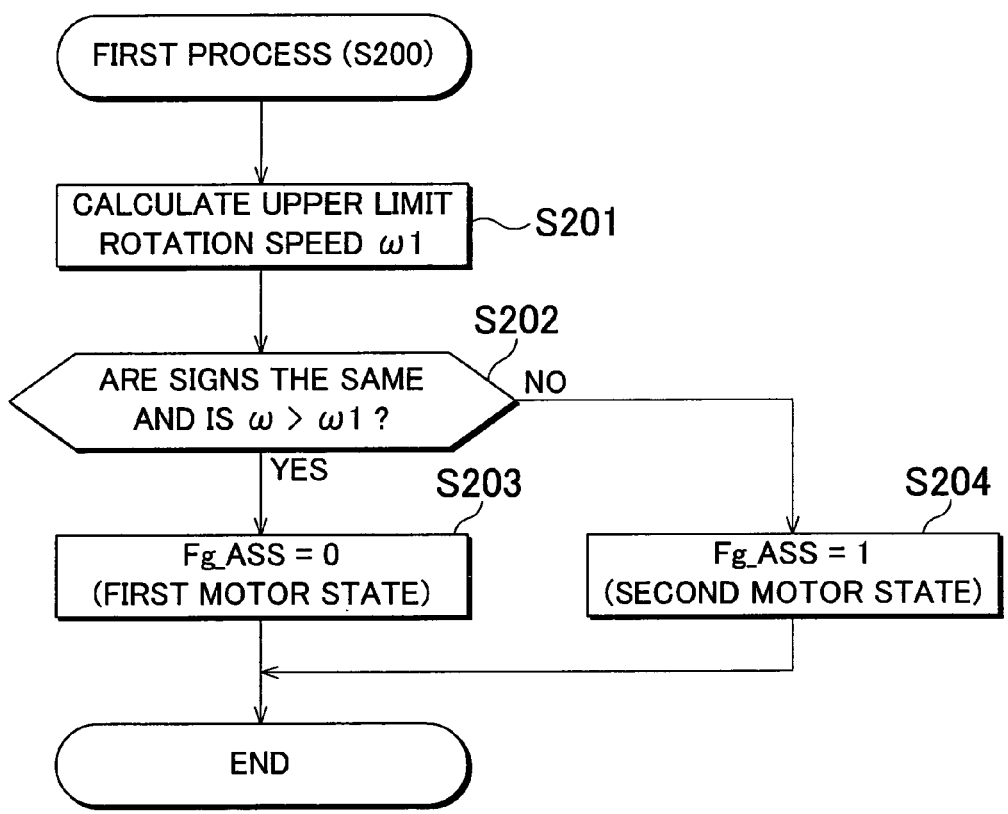
FIG. 6 is a flowchart of a first process that is executed when appropriate in the process of executing the steering control in FIG. 3.

In FIG. 6, the ECU 100 calculates the upper rotation speed $\omega 1$ described above (step S201). Incidentally, when referring Expression (3), in order to make the assist torque Tm a positive value (i.e., act in the direction to assist the steering force), the subtraction term on the right side in Expression (3) must be a positive value (including zero in this case). Therefore, Expression (5) must be satisfied in order for the assist motor 206 to be in the assist possible state. That is, in the EPS 200 the motor command voltage Vq and the motor rotation speed $\omega$ are the factors that determine whether the assist motor 206 is in the assist possible state or the power generating state.

$$Vq/Kv \geq \omega \qquad (5)$$

As is evident from Expression (5) above, in order to keep the assist motor 206 in the assist possible state, the motor rotation speed $\omega$ must be equal to or less than the upper limit value (i.e., Vq/Kv) which is set according to the motor command voltage Vq. This upper limit value is the upper limit rotation speed $\omega 1$ described earlier.

Here, the relationship between the motor command voltage Vq and the upper limit rotation speed $\omega 1$ will be described with reference to FIG. 7 which is a graph showing a frame format of an example of a characteristic of the upper limit rotation speed $\omega 1$ with respect to the motor command voltage Vq.

Figure 7:
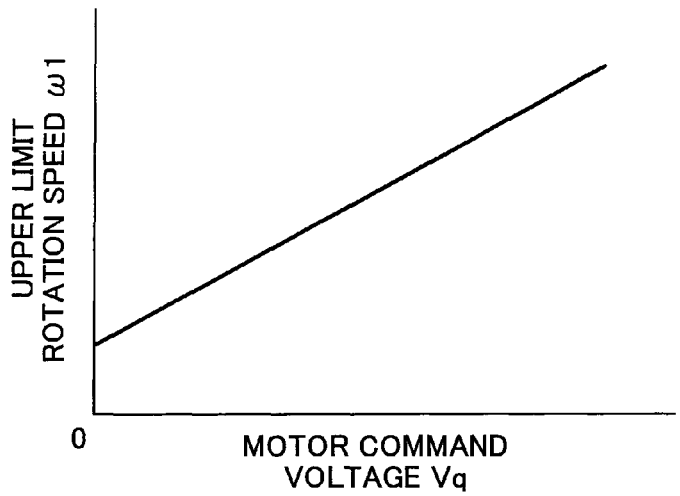
FIG. 7 is a graph showing a frame format of an example of a characteristic of an upper limit rotation speed with respect to the motor command voltage in the vehicle shown in FIG. 1.

In FIG. 7, the vertical axis represents the upper limit rotation speed $\omega 1$ and the horizontal axis represents the motor command voltage Vq. As shown in the graph, the upper limit rotation speed $\omega 1$ is set as a function that increases linearly as the motor command voltage Vq increases. The ECU 100 stores an upper limit rotation speed map, in which the relationship shown in FIG. 7 is converted into numerical terms, in the ROM beforehand, and calculates the upper rotation speed $\omega 1$ by selectively obtaining a value that corresponds to the motor command voltage Vq at that time from the upper limit rotation speed map. However, when calculating the upper limit rotation speed $\omega 1$, it is not absolutely necessary to reference this map. For example, the upper limit rotation speed $\omega 1$ may also be calculated on a case-by-case basis as the quotient of the motor command voltage Vq divided by the back electromotive force coefficient Kv, as shown in Expression (5) above.

Returning back to FIG. 6, when calculating the upper limit rotation speed $\omega 1$, the ECU 100 determines whether the sign of the motor command voltage Vq and the sign of the motor rotation speed $\omega$ are the same, and whether the motor rotation speed $\omega$ is greater than the upper limit rotation speed $\omega 1$ (step S202). That is, the ECU 100 determines whether the assist motor 206 is in the power generating state.

Incidentally, the determining operation by the ECU 100 described here is an example of an operation by the determining apparatus of the invention. In this example embodiment, it is determined whether the assist motor 206 is in the power generating state which is an example of a state that corresponds to a power generating state in the invention. Alternatively, however, in order to more effectively and reliably minimizing the drawback that results from the assist motor 206 falling into the power generating state, the ECU 100 may also determine whether the motor rotation speed $\omega$ will soon exceed the upper limit rotation speed $\omega 1$ (i.e., whether the assist motor 206 will soon fall into the power generating state). In other words, the ECU 100 may also predict or estimate whether the assist motor 206 will fall into the power generating state. The determination reference when this kind of determination, prediction, or estimation is made may be set freely as long as it enables the drawback that results from the assist motor 206 falling into the power generating state to be more effectively and reliably minimized. For example, this kind of determination, prediction, or estimation may be made in a case such as when the motor rotation speed $\omega$ exceeds a determination reference value which is the difference of $\omega 1$ minus a predetermined margin $\Delta\omega$ which is either fixed or variable. Alternatively, this type of margin may also be included beforehand in the upper limit rotation speed $\omega 1$ itself.

If the motor rotation speed $\omega$ is greater than the upper limit rotation speed $\omega 1$ when the signs of Vq and $\omega$ are the same (i.e., YES in step S202), i.e., when the assist motor 206 is in the power generating state, the ECU 100 sets the assist possible flag Fg_ASS to 0 which corresponds to a case in which the assist motor 206 is in the power generating state (step S203).

Incidentally, when the process in step S203 is executed, the previous state of the assist motor 206 is the assist possible state and the current state of the assist motor 206 is the power generating state. Hereinafter, this kind of state of the assist motor 206 will be referred to as the first motor state when appropriate.

If, on the other hand, the signs of Vq and $\omega$ are not the same or the motor rotation speed $\omega$ is equal to or less than the upper limit rotation speed $\omega 1$ (i.e., NO in step S202), i.e., if the assist motor 206 is in the assist possible state, the ECU 100 sets the assist possible flag Fg_ASS to 1 which corresponds to a case in which the assist motor 206 is in the assist possible state (step S204).

Incidentally, when the process in step S204 is executed, the previous state of the assist motor 206 is the assist possible state and the current state of the assist motor 206 is the assist possible state. Hereinafter, this kind of state of the assist motor 206 will be referred to as the second motor state when appropriate. After the process in step S203 or step S204 is executed, the first process ends.

Next, the second process that is executed if the assist motor 206 is currently in the power generating state will be described in detail with reference to FIG. 8 which is a flowchart of the second process.

Figure 8:
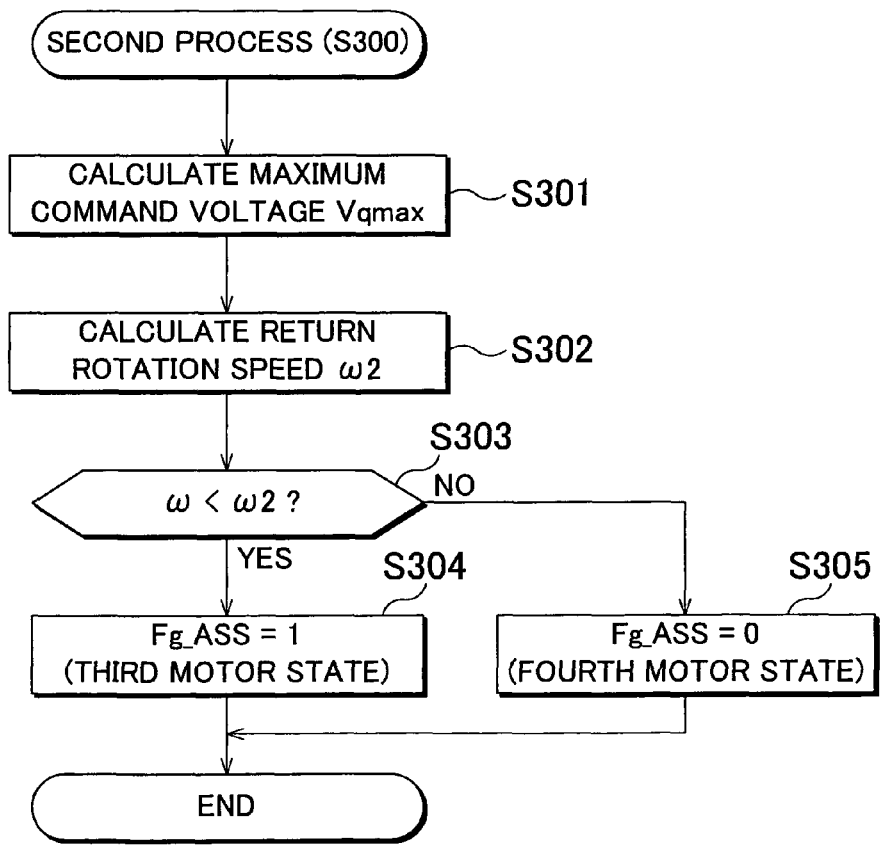
FIG. 8 is a flowchart of a second process that is executed when appropriate in the process of executing the steering control in FIG. 3.

In FIG. 8, the ECU 100 calculates the maximum command voltage Vqmax, which is the maximum value of the motor command voltage Vq described earlier, based on the battery voltage Vbat (step S301).

Here, the relationship between the battery voltage Vbat and the maximum command voltage Vqmax will be described with reference to FIG. 9 which is a frame format of an example of a characteristic of the maximum command voltage Vqmax with respect to the battery voltage Vbat.

Figure 9:
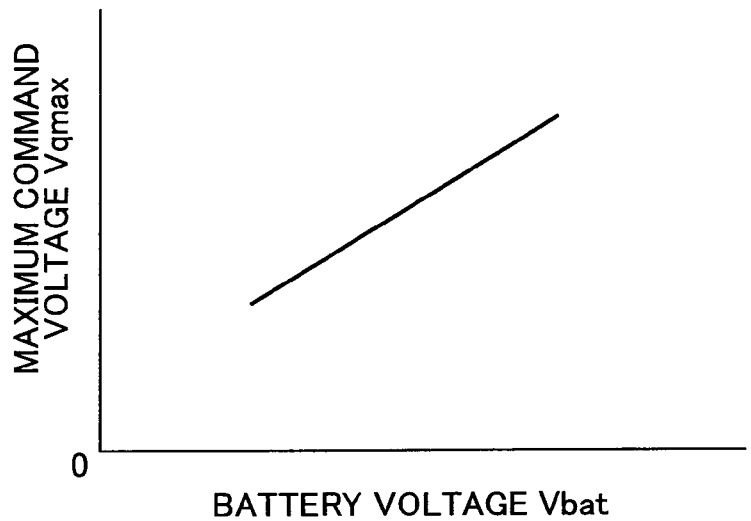
FIG. 9 is a frame format of an example of a characteristic of maximum command voltage with respect to battery voltage in the vehicle shown in FIG. 1.

In FIG. 9, the vertical axis represents the maximum command voltage Vqmax and the horizontal axis represents the battery voltage Vbat. As shown in the graph, the maximum command voltage Vqmax is set as a function that increases linearly as the battery voltage Vbat increases. The ECU 100 stores a maximum command voltage map, in which the relationship shown in FIG. 9 is converted into numerical terms, in the ROM beforehand, and calculates the maximum command voltage Vqmax by selectively obtaining a value that corresponds to the battery voltage Vbat at that time from the maximum command voltage map.

Incidentally, in this case, the battery voltage Vbat is referenced, but the maximum command voltage Vqmax may also be variably set according to the SOC of the battery 400, for example. Alternatively, the maximum command voltage Vqmax may be a fixed value.

Returning now to FIG. 8, when the maximum command voltage Vqmax is calculated, the ECU 100 calculates a return rotation speed $\omega 2$ (step S203). Here, the return rotation speed $\omega 2$ is the value of the motor rotation speed when the assist motor 206 returns from the power generating state to the assist possible state, and is a function of the maximum command voltage Vqmax calculated in step S301.

Here, the relationship between the maximum command voltage Vqmax and the return rotation speed $\omega 2$ will be described with reference to FIG. 10 which is a frame format of an example of a characteristic of the return rotation speed $\omega 2$ with respect to the maximum command voltage Vqmax.

Figure 10:
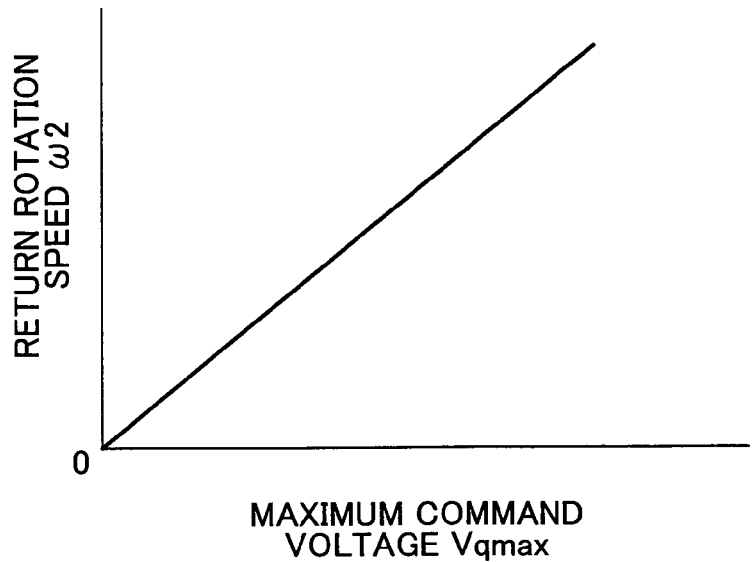
FIG. 10 is a frame format of an example of a characteristic of return rotation speed with respect to the maximum command voltage in the vehicle shown in FIG. 1.

In FIG. 10, the vertical axis represents the return rotation speed $\omega 2$ and the horizontal axis represents the maximum command voltage Vqmax. As shown in the graph, the return rotation speed $\omega 2$ is a function that increases linearly as the maximum command voltage Vqmax increases. The ECU 100 stores a return rotation speed map, in which the relationship shown in FIG. 10 is converted into numerical terms, in the ROM beforehand, and calculates the return rotation speed $\omega 2$ by selectively obtaining a value that corresponds to the maximum command voltage Vqmax calculated in step S301 from the return rotation speed map.

Returning back to FIG. 8, when calculating the return rotation speed $\omega 2$, the ECU 100 determines whether the motor rotation speed $\omega$ is less than the return rotation speed $\omega 2$ (step S303). That is, the ECU 100 determines whether the assist motor 206 has returned to the assist possible state.

If the motor rotation speed $\omega$ is less than the return rotation speed $\omega 2$ (i.e., YES in step S303), i.e., if the assist motor 206 has returned to the assist possible state, the ECU 100 sets the assist possible flag Fg_ASS to 1 which corresponds to a case in which the assist motor 206 is in the assist possible state (step S304).

Incidentally, when the process in step S304 is executed, the previous state of the assist motor 206 is the power generating state and the current state of the assist motor 206 is the assist possible state. Hereinafter, this kind of state of the assist motor 206 will be referred to as the third motor state when appropriate.

If, on the other hand, the motor rotation speed ω is equal to or greater than the return rotation speed ω2 (i.e., NO in step S303), i.e., if the assist motor 206 is not yet in the power generating state, the ECU 100 sets the assist possible flag Fg_ASS to 0 which corresponds to a case in which the assist motor 206 is in the power generating state (step S305).

Incidentally, when the process in step S305 is executed, the previous state of the assist motor 206 is the power generating state and the current state of the assist motor 206 is the power generating state. Hereinafter, this kind of state of the assist motor 206 will be referred to as the fourth motor state when appropriate. After the process in step S304 or step S305 is executed, the second process ends.

Next, the third process that is executed after the first process or the second process will be described in detail with reference to FIG. 11 which is a flowchart of the third process.

Figure 11:
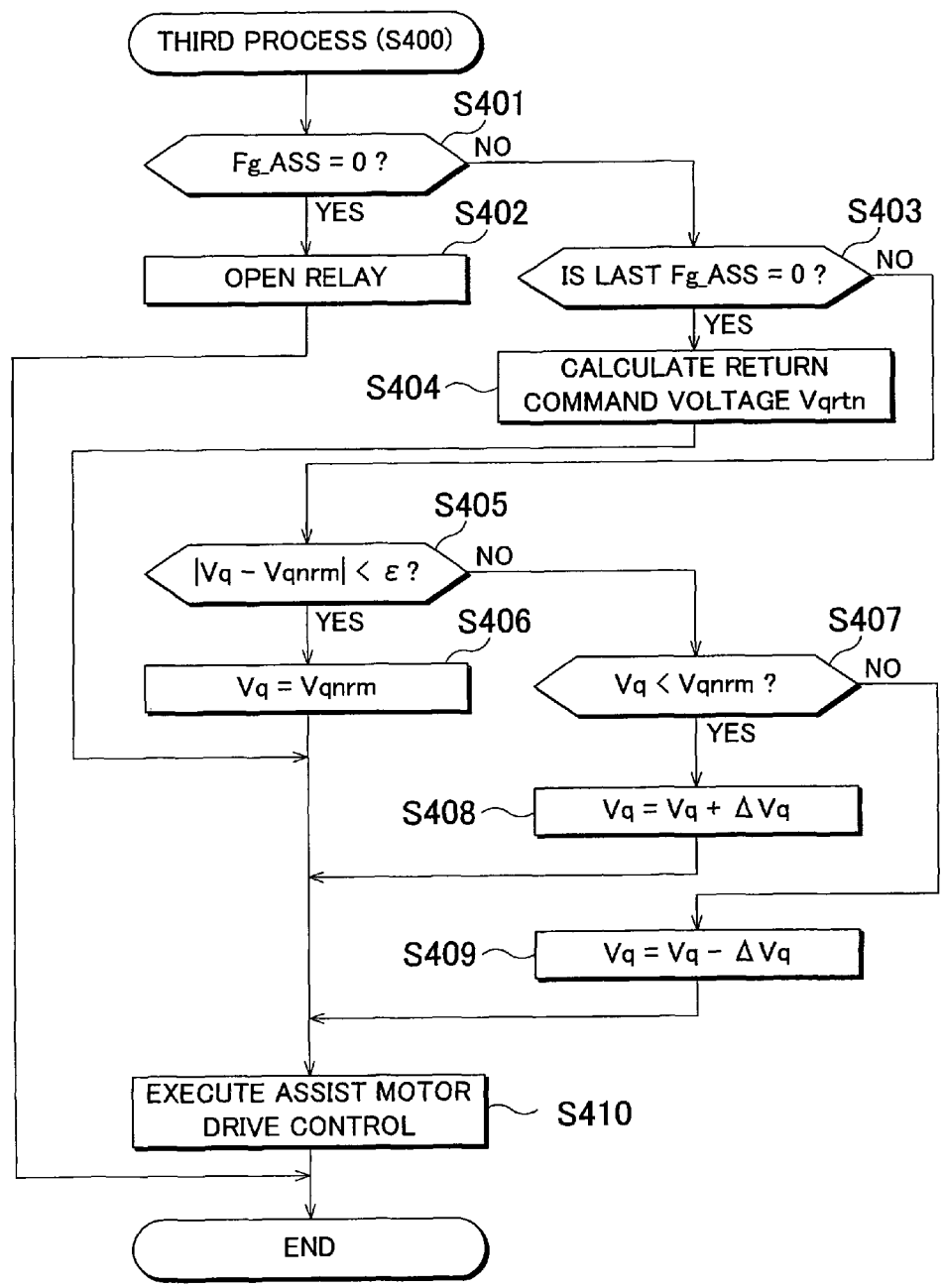
FIG. 11 is a flowchart of a third process that is executed when appropriate in the process of executing the steering control in FIG. 3.

In FIG. 11, the ECU 100 determines whether the assist possible flag Fg_ASS is 0, i.e., whether the assist motor 206 is in the power generating state (step S401). If the assist possible flag Fg_ASS is 0 (i.e., YES in step S401), i.e., if the assist motor 206 is in the first motor state or the fourth motor state described above, the ECU 100 controls the relay portion 208B of the drive apparatus 208 so that it is open (step S402). As the relay portion 208B is controlled open, the supply of current from the PWM circuit portion 208A to the drive portion 208C is interrupted such that the assist motor 206 is in a non-driven state, thus stopping steering force assist (i.e., reverse assist) from the EPS 200. After the relay portion 208 is controlled open, the third process ends.

If, on the other hand, the assist possible flag Fg_ASS is 1 (i.e., NO in step S401), the ECU 100 determines whether the last assist possible flag Fg_ASS is 0 (step S403). If the last assist possible flag Fg_ASS is 0 (i.e., YES in step S403), i.e., if the assist motor 206 is in the third motor state described above, the ECU 100 calculates a return command voltage Vqrtn (step S404).

Here, the return command voltage Vqrtn is a motor command voltage for preventing drivability from deteriorating due to the steering force assist according to the assist torque Tm from being restored suddenly when returning to the assist possible state (i.e., due to the assist motor 206 being in the non-driven state as a result of the relay portion 208B being controlled open at this time). The return command voltage Vqrtn is a value of the motor command voltage Vq that makes the subtraction term on the right side of Expression (3) zero. Therefore, the return command voltage Vqrtn is a function of the motor rotation speed ω.

Here, the relationship between the motor rotation speed ω and the return command voltage Vqrtn will be described with reference to FIG. 12 which is a frame format of an example of a characteristic of the return command voltage Vqrtn with respect to the motor rotation speed ω.

Figure 12:
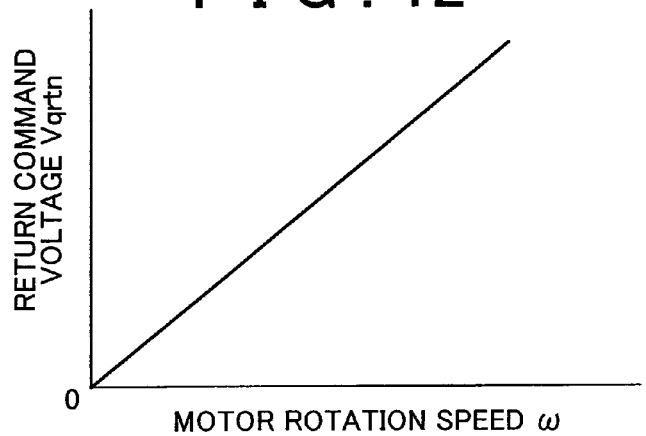
FIG. 12 is a frame format of an example of a characteristic of return command voltage with respect to the motor rotation speed in the vehicle shown in FIG. 1.

In FIG. 12 the vertical axis represents the return command voltage Vqrtn and the horizontal axis represents the motor rotation speed ω. As shown in the graph, the return command voltage Vqrtn is a function that increases linearly as the motor rotation speed ω increases. The ECU 100 stores a return command voltage map, in which the relationship shown in FIG. 12 is converted into numerical terms, in the ROM beforehand, and calculates the return command voltage Vqrtn by selectively obtaining a value that corresponds to the motor rotation speed ω from the return command voltage map.

Returning now to FIG. 11, when calculating the return command voltage Vqrtn, the ECU 100 executes drive control of the assist motor 206 (step S410). That is, the return command voltage Vqrtn is made the motor command voltage Vq and the PWM circuit portion 208A is controlled. The PWM circuit portion 208A sends a PWM control voltage signal (three-phase voltage in this example embodiment) corresponding to the return command voltage Vqrtn to the drive portion 208C. As a result, current is supplied to the stator of the assist motor 206 such that the assist motor 206 outputs the assist torque Tm. Incidentally, when step S410 is executed after step S404, the assist torque Tm is zero.

If, on the other hand, the last assist possible flag Fg_ASS is 1 (i.e., NO in step S403), i.e., if the assist motor 206 is in the second motor state described above, the ECU 100 determines whether the absolute value of the difference between the current motor command voltage Vq and the reference motor command voltage Vqnrm set earlier in step S104 of the steering control is less than a reference difference ε (step S405).

Here, the reference differences is an index value that defines the degree to which the assist torque Tm has converged on the target assist torque Tmtg. The reference difference ε is set beforehand, based on testing, experience, theory, or simulation or the like, to a value that makes it possible to determine whether the assist torque Tm is converging on the target assist torque Tmtg to a degree where there is at least no significant problem in practice.

If the absolute value is less than the reference difference ε (i.e., YES in step S405), the ECU 100 sets the reference motor command voltage Vqnrm set earlier as the motor command voltage Vq (step S406), and executes drive control of the assist motor 206 described above (step S410). As a result, the assist torque Tm is maintained as quickly as possible at the target assist torque Tm through PI control in which the assist current Iq is fed back.

If, on the other hand, the absolute value of the difference between the current motor command voltage Vq and the reference motor command voltage Vqnrm is equal to or greater than the reference difference ε (i.e., NO in step S405), then it is first determined whether the reference motor command voltage Vqnrm is greater than the motor command voltage Vq at a point when only a short time has passed after the assist torque Tm started to be controlled based on the return command voltage Vqrtn described above, for example (step S407). Incidentally, this process is a process that corresponds to a change in the magnitude relation between Vq and Vqnrm according to the steering direction of the vehicle 10.

If the reference motor command voltage Vqnrm is greater than the motor command voltage Vq (i.e., YES in step S407), the ECU 100 updates the motor command voltage Vq by adding a predetermined gradual change amount ΔVq to it to obtain the latest motor command voltage Vq (step S408). Also, if the reference motor command voltage Vqnrm is equal to or less than the motor command voltage Vq (that is, if Vqnrm is less than Vq after step S405) (i.e., NO in step S407), the ECU 100 updates the motor command voltage Vq by subtracting the predetermined gradual change amount ΔVq from the current motor command voltage Vq to obtain the latest motor command voltage Vq (step S409).

Both steps S408 and S409 are steps to make the motor command voltage Vq asymptotic with the reference motor command voltage Vqnrm, and are part of the process to gradually change the assist torque Tm when returning to the assist possible state. After executing these steps, the ECU 100 moves on to step S410 where it drives the assist motor 206 according to the set motor command voltage Vq. After the drive control of the assist motor 206 is performed, the third process ends.

As described above, according to the steering control of this example embodiment, it is determined whether the assist motor 206 is in the power generating state based on the motor rotation speed ω and the motor command voltage Vq (i.e., whether the assist direction of the assist motor 206 is the reverse assist direction). If the assist motor 206 is in the power generating state, the relay portion 208B of the drive apparatus 208 that drives the assist motor 206 is controlled open such that the supply of current to the assist motor 206 is interrupted. As a result, the amount of power generated by assist motor 206 is reduced to zero, thus preventing a situation from occurring in which the assist torque Tm acts in the reverse assist direction. Accordingly, a decrease in steering feel due to the assist torque Tm acting in the reverse assist direction from the back electromotive force of the assist motor 206 can be suppressed as quickly as possible.

Furthermore, according to this example embodiment, when the assist motor 206 is returned to the assist possible state from the power generating state, the assist torque Tm is gradually changed to a target value (an example in this case is Vqnrm+ε or Vqnrm−ε). Therefore, steering force assist can be restored without giving the driver an unpleasant sensation so a decrease in steering feel can be suitably prevented. That is, according to the example embodiment, a decrease in handling when there is an upper limit value place on the driving voltage of the assist motor can be suitably suppressed.

Incidentally, in this example embodiment, the example in which the relay portion 208B of the drive apparatus 208 is controlled open (i.e., in which the amount of power generated is reduced to zero) is described as one example of "controlling the drive apparatus to reduce the amount of power generated" in the invention. However, the mode of reducing the amount of power generated by the assist motor 206 is not limited to this. For example, the amount of power generated by the assist motor 206 may also be reduced by controlling the amount of power that is generated in two steps, incrementally (i.e., in a plurality of steps), or continuously (i.e., in a non-stepped manner), via the PWM circuit portion 208A, for example.

Next, a vehicle 20 according to a second example embodiment of the invention will be described with reference to FIG. 13 which is a schematic diagram conceptually illustrating the structure of the vehicle 20. Incidentally, parts in FIG. 13 that are the same as parts in FIG. 1 will be denoted by like reference characters and descriptions of those parts will be omitted when appropriate.

Figure 13:
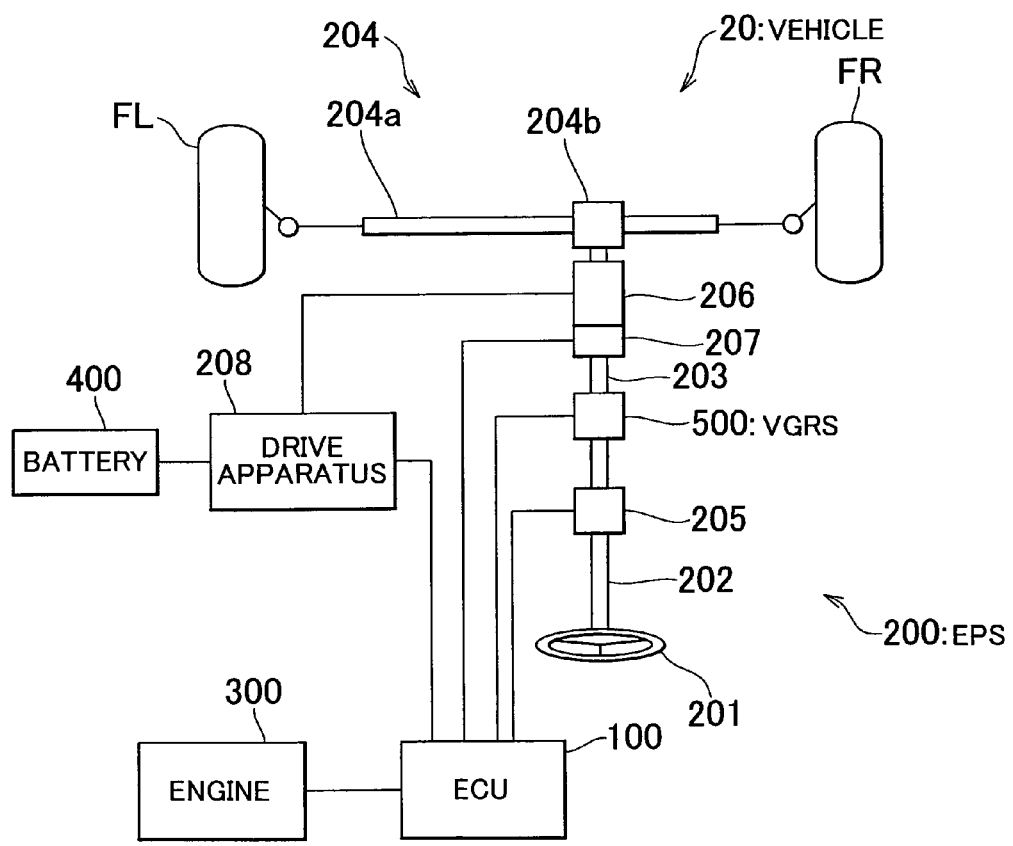
FIG. 13 is a schematic diagram conceptually showing the structure of a vehicle according to a second example embodiment of the invention.

The vehicle 20 according to this second example embodiment shown in FIG. 13 differs from the vehicle 10 according to the first example embodiment shown in FIG. 1 in that it is provided with VGRS (Variable Gear Ratio Steering) 500 on the pinion shaft 203. The VGRS 500 includes a VGRS motor, not shown. The rotor of this VGRS motor is fixed to the pinion shaft 203 upstream (i.e., on the steering wheel 201 side) of the assist motor 206. The VGRS 500 is able to continuously change the rotation speed ratio between the steering shaft 202 and the pinion shaft 203 (primarily, the steering gear ratio which is the ratio of the output steering angle to the input steering angle) by increase or decrease correcting the rotation speed of the pinion shaft 203 using output torque generated by the VGRS motor. That is, the VGRS 500 is one example of a variable steering gear ratio apparatus of the invention.

Incidentally, any one of a variety of apparatuses, either known or unknown, may be used as the variable gear ratio steering apparatus of the invention as long as it able to vary the steering gear ratio, so a detailed description of the apparatus will be omitted here.

In this kind of structure, the VGRS 500 is such that the VGRS motor and the drive apparatus thereof are electrically connected to the ECU 100. Normally, a target value for the steering gear ratio is determined according to the steering wheel angle, and the VGRS motor is driven so that the steering gear ratio matches that target value.

Meanwhile, the rotation speed of the pinion shaft 203 has a primary relationship with the motor rotation speed ω which is the rotation speed of the assist motor 206 (i.e., even if the assist motor 206 is connected to the pinion shaft 203 via a reduction gear, the rotation speed of the pinion shaft 203 is the same as the motor rotation speed ω except for the gear ratio). Therefore, the condition for the assist motor 206 being in the assist possible state described above is defined by Expression (6) below.

$$\omega 1 \geq \omega; \quad \omega = \omega_{steeringshaft} + \omega_{VGRS} \tag{6}$$

where $\omega_{VGRS}$ is the rotation speed of the VGRS 500, and $\omega_{steeringshaft}$ is the rotation speed of the steering shaft 202. In this way, when the mechanism for varying the steering gear ratio is on the upstream side of the assist motor 206, the motor rotation speed to keep the assist motor 206 in the assist possible state is limited by the operation on the VGRS side. In other words, when the steering shaft 202 rotation speed $\omega_{steeringshaft}$ is the upper limit rotation speed ω1 and the motor rotation speed ω is increased by the VGRS 500, the assist motor 206 falls into the power generating state, and as a result, handling deteriorates.

Therefore, in this example embodiment, when the assist motor 206 is in the assist possible state, the ECU 100 limits the control range of the steering gear ratio by the VGRS 500 according to the motor rotation speed ω. That is, the ECU 100 functions as an example of a third control apparatus and a limiting apparatus of the invention.

At this time, as one preferred control mode, the ECU 100 limits the control range of the steering gear ratio so that the correction amount $\omega_{VGRS}$ satisfies Expression (6) above. Meanwhile, if the assist motor 206 is in the power generating state and the control in the first example embodiment is followed, the assist motor 206 will become in a non-driven state so a substantive limitation will no longer be placed on the operation of the VGRS 500. As a result, normal gear ratio control according to the steering wheel angle can be realized.

In this way, according to this example embodiment, the turning performance of the vehicle 20 can be ensured as quickly as possible while assisting the steering force over a wide range as quickly as possible by performing drive control of the VGRS motor that is based on the steering torque MT when the assist motor 206 is in the power generating state, and limiting the driving control of the VGRS that is based on the steering torque MT according to the motor rotation speed ω of the assist motor 206 (or simply by controlling the driving state of the VGRS motor according to the motor rotation speed ω of the assist motor 206) when the assist motor 206 is in the assist possible state.

The invention claimed is:

1. A steering control apparatus for a vehicle provided with an electric power steering apparatus having a motor capable of applying assist steering torque to a steering shaft, and a drive apparatus capable of driving the motor by supplying driving voltage to the motor, comprising:
   a first control apparatus configured to control the drive apparatus such that the driving voltage is supplied at equal to or less than a predetermined upper limit voltage to apply the assist steering torque that is based on a steering amount of a predetermined kind to the steering shaft;

a determining apparatus configured to determine whether the motor is in a state that corresponds to a power generating state based on a rotation speed of the motor and the supplied driving voltage when a sign of the driving voltage and the sign of the motor rotation speed are the same with a driver's steering operation; and a second control apparatus configured to control the drive apparatus to reduce the amount of power generated by the motor when it is determined that the motor is in the state that corresponds to the power generating state.

2. The steering control apparatus according to claim 1, wherein the determining apparatus determines whether the motor is in the state that corresponds to the power generating state by comparing i) an upper limit rotation speed which defines an upper limit of an absolute value of the rotation speed of the motor capable of applying the assist steering torque and which is set based on the supplied driving voltage, with ii) the absolute value of the rotation speed of the motor.

3. The steering control apparatus according to claim 1, wherein the second control apparatus controls the drive apparatus such that the supply of driving voltage is interrupted when it is determined that the motor is in the state that corresponds to the power generating state.

4. The steering control apparatus according to claim 1, wherein the first control apparatus gradually changes the assist steering torque to a target value when the state of the motor changes from the power generating state to an assist possible state that corresponds to a state other than the power generating state.

5. The steering control apparatus according to claim 4, wherein the first control apparatus controls the drive apparatus such that an initial value when gradually changing the assist steering torque becomes zero.

6. The steering control apparatus according to claim 1, wherein the vehicle also at least has a variable steering gear ratio apparatus, which is capable of changing the steering gear ratio that is the ratio between an input steering angle and an output steering angle, provided on the upstream side of the motor; and the steering control apparatus for a vehicle is provided with a third control apparatus that controls the variable steering gear ratio apparatus to change the steering gear ratio according to the steering amount, and a limiting apparatus that limits a control range of the steering gear ratio according to the rotation speed of the motor when it is determined that the motor is not in the state that corresponds to the power generating state.

7. The steering control apparatus according to claim 6, wherein the third control apparatus limits the control range of the steering gear ratio of the variable steering gear ratio apparatus such that the rotation speed of the motor becomes equal to or less than the upper limit rotation speed.

8. A steering control method for a vehicle provided with an electric power steering apparatus having a motor capable of applying assist steering torque to a steering shaft, and a drive apparatus capable of driving the motor by supplying driving voltage to the motor, comprising:

controlling the drive apparatus such that the driving voltage is supplied at equal to or less than a predetermined upper limit voltage to apply the assist steering torque that is based on a steering amount of a predetermined kind to the steering shaft;

determining whether the motor is in a state that corresponds to a power generating state based on a rotation speed of the motor and the supplied driving voltage when a sign of the driving voltage and the sign of the motor rotation speed are the same with a driver's steering operation; and controlling the drive apparatus to reduce the amount of power generated by the motor when it is determined that the motor is in the state that corresponds to the power generating state.

9. The steering control method according to claim 8, further comprising:

determining whether the motor is in the state that corresponds to the power generating state by comparing i) an upper limit rotation speed which defines an upper limit of an absolute value of the rotation speed of the motor capable of applying the assist steering torque and which is set based on the supplied driving voltage, with ii) the absolute value of the rotation speed of the motor.

10. The steering control method according to claim 8, further comprising:

controlling the drive apparatus such that the supply of driving voltage is interrupted when it is determined that the motor is in the state that corresponds to the power generating state.

11. The steering control method according to claim 8, further comprising:

gradually changing the assist steering torque to a target value when the state of the motor changes from the power generating state to an assist possible state that corresponds to a state other than the power generating state.

12. The steering control method according to claim 11, further comprising:

controlling the drive apparatus such that an initial value when gradually changing the assist steering torque becomes zero.

13. The steering control method according to claim 8, wherein the vehicle also at least has a variable steering gear ratio apparatus, which is capable of changing the steering gear ratio that is the ratio between an input steering angle and an output steering angle, provided on the upstream side of the motor; further comprising:

controlling the variable steering gear ratio apparatus to change the steering gear ratio according to the steering amount; and limiting a control range of the steering gear ratio according to the rotation speed of the motor when it is determined that the motor is not in the state that corresponds to the power generating state.

14. The steering control method according to claim 13, further comprising:

limiting the control range of the steering gear ratio of the variable steering gear ratio apparatus such that the rotation speed of the motor becomes equal to or less than the upper limit rotation speed.

* * * * *